United States Patent
Yoon et al.

(10) Patent No.: US 8,331,652 B2
(45) Date of Patent: Dec. 11, 2012

(54) SIMULTANEOUS LOCALIZATION AND MAP BUILDING METHOD AND MEDIUM FOR MOVING ROBOT

(75) Inventors: SukJune Yoon, Seoul (KR); Seung Ki Min, Suwon-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 928 days.

(21) Appl. No.: 12/153,817

(22) Filed: May 23, 2008

(65) Prior Publication Data

US 2009/0154791 A1 Jun. 18, 2009

(30) Foreign Application Priority Data

Dec. 17, 2007 (KR) .................. 10-2007-0132375

(51) Int. Cl.
*G06K 9/00* (2006.01)
*G01C 22/00* (2006.01)
*G01C 21/32* (2006.01)

(52) U.S. Cl. .......... 382/153; 382/154; 701/26; 701/208; 701/209; 701/210

(58) Field of Classification Search .............. 382/153; 701/26, 208, 209, 210
See application file for complete search history.

(56) References Cited

U.S. PATENT DOCUMENTS 7,386,183 B2 * 6/2008 Tamura ..................... 382/260
7,826,926 B2 * 11/2010 Myeong et al. .............. 700/245

FOREIGN PATENT DOCUMENTS

JP 10-160463 6/1998

OTHER PUBLICATIONS

A. Briggs, Y. Li, D. Scharstein, M. Wilder. Robot Navigation Using 1D Panoramic Images. In Proc. of IEEE Intl. Conference on Robotics and Automation (ICR4 2006), Orlando, FL, May 2006.*
A. Briggs. Y. Li, and D. Scharstein, "Matching features across 1D panoramas," in Omnivis 2005, the Sixth Workshop on Onnidirectional Vision. Oct. 2005.*
A. Briggs. C. Detweiler. P. Mullen. and D. Scharstein. "Scale-space features in 1D omnidirectional images." in Omnivis 2001. the Fifth Vorkshop on Onmidirectional Vision, May 2004, pp. 115-126.*
Durrant-Whyte, Hugh "Localization, Mapping, and the Simultaneous Localization and Mapping Problem." Australian Center for Field Robotics. Sydney. 2002.*

* cited by examiner

*Primary Examiner* — David Zarka
*Assistant Examiner* — Ha Le
(74) *Attorney, Agent, or Firm* — Staas & Halsey LLP (57) ABSTRACT

A simultaneous localization and map building (SLAM) method and medium for a moving robot is disclosed. The SLAM method includes extracting a horizontal line from an omni-directional image photographed at every position where the mobile robot reaches during a movement of the mobile robot, correcting the extracted horizontal line, to create a horizontal line image, and simultaneously executing a localization of the mobile robot and building a map for the mobile robot, using the created horizontal line image and a previously-created horizontal line image.

19 Claims, 4 Drawing Sheets

SIMULTANEOUS LOCALIZATION AND MAP BUILDING METHOD AND MEDIUM FOR MOVING ROBOT

CROSS-REFERENCE TO RELATED APPLICATIONS

This application claims the benefit of Korean Patent Application No. 10-2007-132375, filed on Dec. 17, 2007 in the Korean Intellectual Property Office, the disclosures of which are incorporated herein by reference.

BACKGROUND

1. Field

Embodiments of the present invention relate to a simultaneous localization and map building (SLAM) method and medium for a moving robot, and, more particularly, to a SLAM method for a moving robot, which is capable of achieving a SLAM using an omni-directional image.

2. Description of the Related Art

An omni-directional camera is known as a camera capable of obtaining a 360° image around the camera. Recently, a SLAM technique for a mobile robot has been proposed. In the SLAM technique, an omni-directional camera is mounted to the mobile robot, to photograph an omni-directional image during a movement of the mobile robot. Using the omni-directional image, a SLAM is achieved.

This technique is disclosed in, for example, Japanese Unexamined Patent Publication No. 10-160463. In the disclosed technique, an omni-directional vision sensor having an omni-directional field of view is mounted to a mobile body, to obtain images around the mobile body in the form of time-series standard patterns while moving the mobile body along specific paths. The time-series standard pattern images are compared with an image obtained by the omni-directional vision sensor when the mobile body moves an arbitrary path. When the latter image is identical to one of the standard pattern images, a position associated with the identical standard pattern image is recognized through detection for the mobile body.

However, the above-mentioned conventional SLAM method has problems in that a plurality of reference images, which have standard patterns, must be prepared in advance, because a desired localization is carried out based on such reference images.

Furthermore, the conventional SLAM method requires the comparison of the obtained omni-directional image with all reference images. For this reason, the calculation task increases, so that the time taken to achieve a desired SLAM for the mobile body is lengthy.

SUMMARY

Embodiments of the present invention have been made in view of the above-mentioned problems, and accordingly, an aspect of embodiments of the present invention is to provide a SLAM method capable of achieving a SLAM for a mobile robot without using reference images.

Another object of embodiments of the present invention is to provide a SLAM method for a mobile robot capable of achieving a SLAM, only using horizontal line information of an omni-directional image, thereby reducing the time taken to achieve the SLAM.

Additional aspects and/or advantages will be set forth in part in the description which follows and, in part, will be apparent from the description, or may be learned by practice of the invention.

In accordance with one aspect, embodiments of the present invention provide a simultaneous localization and map building method and medium for a mobile robot, including extracting a horizontal line from an omni-directional image photographed at every position where the mobile robot reaches during a movement of the mobile robot, correcting the extracted horizontal line, to create a horizontal line image, and simultaneously executing a localization of the mobile robot and building a map for the mobile robot, using the created horizontal line image and a previously-created horizontal line image.

The correction of the extracted horizontal line may be executed using a Gaussian filter.

The created horizontal line image may comprise at least two horizontal lines respectively created by filtering the extracted horizontal line and then arranged above and beneath the extracted horizontal line.

The extracted horizontal line may comprise pixels, and has a feature point. The feature point may be a dark pixel having a brightness lower than the remaining pixels of the extracted horizontal line by one brightness level.

The created horizontal line image may have the feature point. Coordinates of the feature point may be derived by applying the position of the mobile robot and an angle defined between the mobile robot and the feature point to the below expression, for example.

$$\tan\alpha = \frac{Y-y}{X-x}$$ [Expression]

$$\begin{bmatrix} \tan\alpha_1 - 1 \\ \tan\alpha_2 - 1 \\ \tan\alpha_3 - 1 \\ \tan\alpha_4 - 1 \end{bmatrix} \cdot \begin{bmatrix} X_1 \\ Y_1 \end{bmatrix} = \begin{bmatrix} \tan\alpha_1 \cdot x_1 - y_1 \\ \tan\alpha_2 \cdot x_2 - y_2 \\ \tan\alpha_3 \cdot x_3 - y_3 \\ \tan\alpha_4 \cdot x_4 - y_4 \end{bmatrix}$$

Here, "$\alpha$" represents an angle defined between the mobile robot and the feature point, "X, Y" represents the coordinates of the feature point, and "x, y" represents the coordinates of the mobile robot.

The angle defined between the mobile robot and the feature point in the created horizontal line image may be derived by matching the feature point in the created horizontal line image with the feature point of the previously-created horizontal line image.

The feature point matching may be executed using a sum of absolute difference (SAD) method.

The simultaneous localization and map building for the mobile robot may be executed by applying, to an extended Kalman filter, the position of the mobile robot, the position of the feature point, and the angle defined between the mobile robot and the feature point in the created horizontal line image.

In accordance with another aspect, embodiments of the present invention provide a simultaneous localization and map building method, and medium for a mobile robot, including extracting a horizontal line from an omni-directional image photographed during a movement of the mobile robot, matching the extracted horizontal line with a previously-extracted horizontal line, to derive an angle defined between the mobile robot and a feature point on the extracted horizontal line, and finding a position of the feature point, using a variation in the angle depending on a moved position of the mobile robot.

The simultaneous localization and map building method may further comprise applying, to an extended Kalman filter, the position of the mobile robot, the position of the feature point, and the angle defined between the mobile robot and the feature point on the created horizontal line, after the position of the feature point is found, to build a map according to the moved position of the mobile robot.

The simultaneous localization and map building method may further comprise creating new horizontal lines arranged above and beneath the extracted horizontal line, after the extraction of the horizontal line, by filtering the extracted horizontal line by a Gaussian filter, and arranging the filtered horizontal line above or beneath the extracted horizontal line.

The newly-created horizontal lines may be matched with previously-created horizontal lines, respectively, to derive an angle defined between the mobile robot and the feature point on each of the newly-created horizontal lines.

The feature point may be a dark pixel included in pixels of the extracted horizontal line while having a brightness lower than the remaining pixels of the extracted horizontal line by one brightness level.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
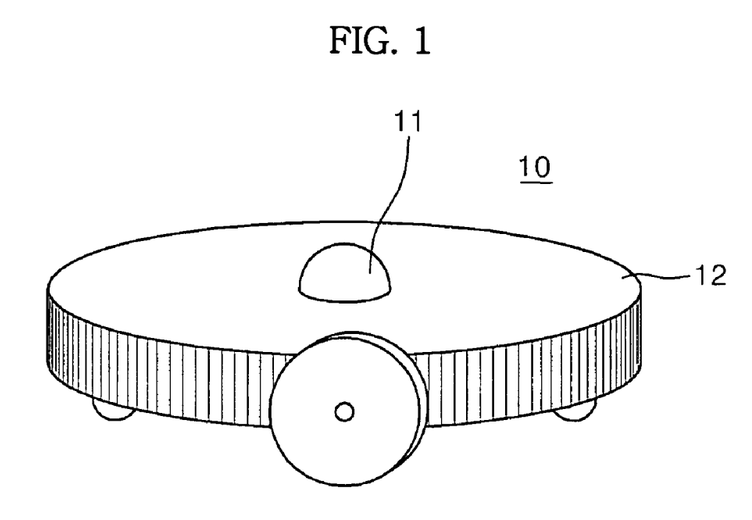
FIG. 1 is a view illustrating an outer structure of a mobile robot according to an exemplary embodiment of the present invention.
Figure 2:
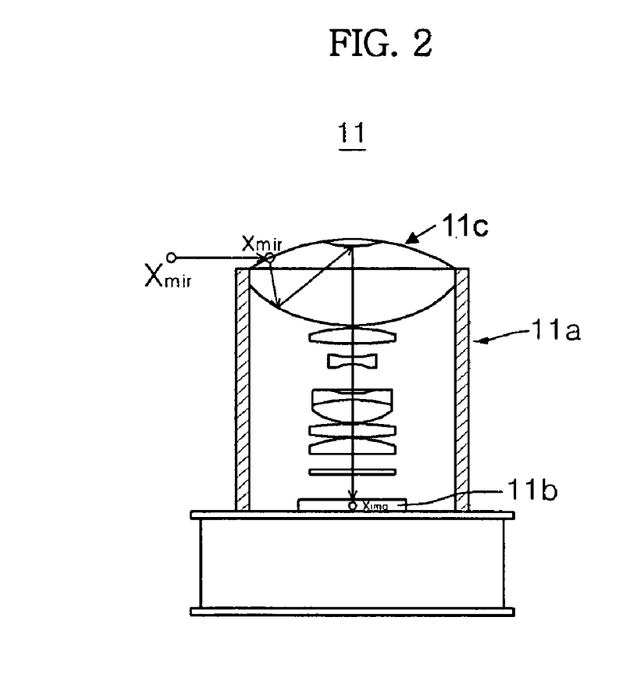
FIG. 2 is a schematic sectional view illustrating an omni-directional camera mounted to the mobile robot of FIG. 1.
Figure 3:
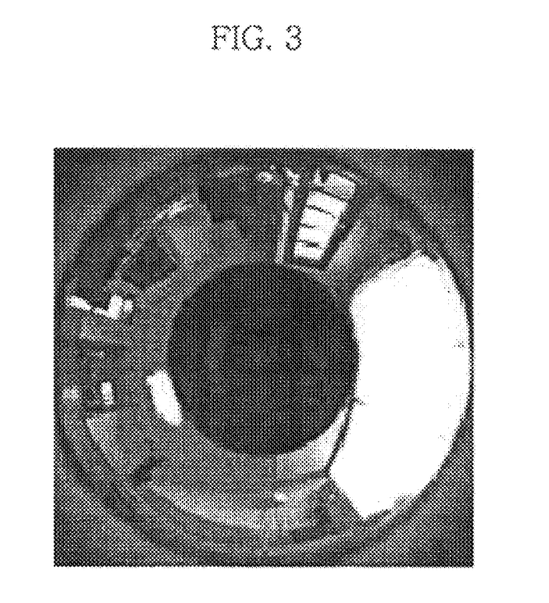
FIG. 3 is a view illustrating an omni-directional image photographed by the omni-directional camera of FIG. 2.

Referring to FIG. 1, a mobile robot, to which embodiments of the present invention are applied, is illustrated. The mobile robot 10 includes a robot body 12, and an omni-directional camera 11 mounted to the robot body 12. As shown in FIG. 2, the omni-directional camera 11 includes an omni-directional lens 11a and a charge-coupled device (CCD) 11b. A curved mirror 11c is mounted to a front surface of the omni-directional camera 11, so that the omni-directional camera 11 can obtain a 360° therearound, as shown in FIG. 3. That is, light reflected from a spatial point Xmir is reflected from a point xmir on a surface of the curved mirror 11c, and is then focused on the CCD 11b, to form an image point ximg on an imaging plane. Thus, the omni-directional camera 11 can obtain a 360° image because the point xmir is distributed in all directions.

Figure 4:
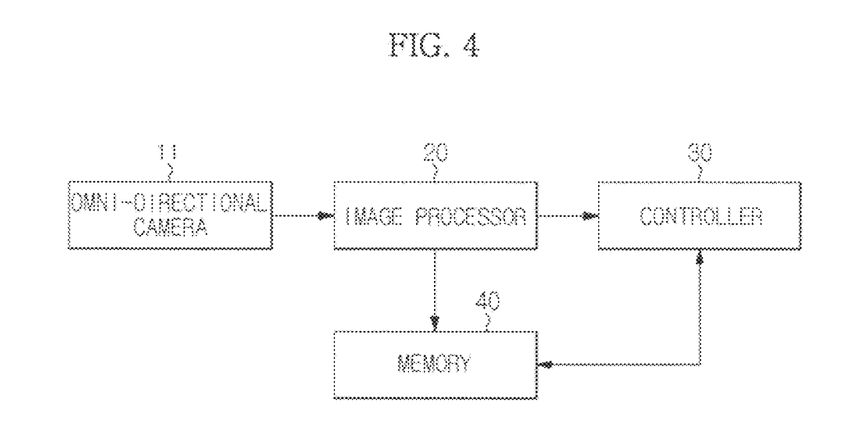
FIG. 4 is a block diagram illustrating a configuration of the mobile robot according to an embodiment of the present invention.

As shown in FIG. 4, the mobile robot 10, to which embodiments of the present invention are applied, includes, in addition to the constituent elements shown in FIGS. 1 and 2, an image processor 20 to extract a horizontal line image from an omni-directional image photographed by the omni-directional camera 11, and then to reconstruct the extracted horizontal line image. The mobile robot 10 also includes a controller 30 to execute a simultaneous localization and map building (SLAM) operation, using the reconstructed horizontal line image, and a memory 40 to store the reconstructed horizontal line image.

As shown in FIG. 3, the omni-directional image photographed by the omni-directional camera 11 is a 360° image. The omni-directional image contains a background, and an object having a brightness different from the brightness of the background. An example of such an object is an article or a person. In the omni-directional image, edge points existing between the object and the background are darker than regions around the edge points. Accordingly, these edge points can function as mileposts enabling the localization for the mobile robot 10 to be easily achieved. In embodiments of the present invention, such an edge point is referred to as a "feature point".

Referring again to FIG. 4, when the overall portion of the omni-directional image photographed by the omni-directional camera 11 is used to achieve a localization of the mobile robot, a time delay occurs due to an excessively-large data processing load because the overall portion of the omni-directional image results in the processing of a huge amount of data. To avoid this data processing problem, the image processor 20 may extract a horizontal line existing on the same plane as an epipolar plane of the omni-directional camera 11, from the omni-directional image input to the image processor 20. However, if the ground surface, on which the mobile robot 10 moves, has an irregular surface portion having slight irregularities, there may be a problem in that the horizontal line photographed by the omni-directional camera 11 may vary or disappear.

To avoid this problem of the horizontal line varying or disappearing, the image processor 20 executes a horizontal line reconstruction operation, using a Gaussian filter, in order to reduce tracing errors that may be incurred in a feature point matching operation of the controller 30, which will be described later. In accordance with an application of the Gaussian filter, the frequency of a feature point, which is higher than the frequency of a region around the feature point, is attenuated. As a result, errors generated during the feature point matching operation of the controller 30 can be reduced.

The image containing the horizontal lines reconstructed by the image processor 20 includes 5 horizontal lines. The third line of the horizontal lines corresponds to a horizontal line present within the omni-directional image before the reconstruction of the horizontal lines. A 3×3 Gaussian filter is applied to the second horizontal line (the horizontal line arranged just above the third horizontal line) and the fourth horizontal line (the horizontal line arranged just below the third horizontal line) in the reconstructed horizontal line image. On the other hand, a 5×5 Gaussian filter is applied to the first horizontal line (the horizontal line arranged just above the second horizontal line) and the fifth horizontal line (the horizontal line arranged just below the fourth horizontal line) in the reconstructed horizontal line image.

The image processor 20 sends the reconstructed horizontal line image to the controller 30, while storing the reconstructed horizontal line image in the memory 40.

The controller 30 not only receives the reconstructed horizontal line image from the image processor 20, but also receives the reconstructed horizontal line image from the memory 40. From the received horizontal line images, the controller 30 finds feature points corresponding to boundaries of colors. The controller 30 then executes a SLAM operation for the mobile robot, using the found feature points.

In order to achieve a SLAM for the mobile robot, it may be necessary to use the angle defined between the mobile robot and each feature point, the two-dimensional spatial coordinates of the mobile robot, and the two-dimensional spatial coordinates of each feature point. Since the two-dimensional spatial coordinates of the mobile robot is determined in accordance with a movement of the mobile robot, they can be recognized by the controller 30. The angle defined between the mobile robot and each feature point can be derived through a matching performed between the reconstructed horizontal line image currently sent from the image processor 20 and the reconstructed horizontal line image stored in the memory 40.

The number of pixels constituting each horizontal line varies depending on the characteristics of the CCD 11b. The number of pixels of each horizontal line is set in the controller 30. Accordingly, it is possible to detect a variation of the angle defined between the mobile robot and each feature point during a movement of the mobile robot by finding a feature point from each horizontal line, and matching the feature point in a horizontal line newly input in accordance with the movement of the mobile robot with the feature point in the previous horizontal line. That is, if the number of pixels constituting a horizontal line is 360, one pixel of the horizontal line corresponds to 1° because the horizontal line image is a single line. If a feature point is positioned at the 50th pixel of the horizontal line image, the angle defined between the feature point and the mobile robot in the horizontal line image is 50°. As the mobile robot moves, the angle of the feature point positioned at a position corresponding to 50° is varied.

The matching of horizontal line images may be achieved by creating a window having a 5×5 size from the previously-reconstructed horizontal line image stored in the memory 40, and matching the created window with the currently-reconstructed horizontal line image input from the image processor 20 in accordance with a sum of absolute difference (SAD) method.

The controller 30 can derive the angle defined between the mobile robot 10 and each feature point in accordance with the above-described feature point matching. However, the controller 30 cannot find the position of each feature point in each horizontal line image because the distance between the feature point and the mobile robot may not be known. In detail, the controller 30 may not recognize a variation in the distance occurring during a movement of the mobile robot 10 because the omni-directional camera 11 may always photograph the same position (for example, a wall surface), to obtain a horizontal line image, irrespective of the movement of the mobile robot 10. As a result, the controller 30 cannot recognize a variation in the distance between the feature point and the mobile robot occurring during the movement of the mobile robot 10, so that it may be impossible to find the position of the feature point.

Accordingly, in order to find the position of each feature point in the horizontal line image, the controller 30 may derive a two-dimensional position (X, Y) of the feature point by applying, to the below Expression 1, for example, coordinates (x, y) of the mobile robot and angles α between the mobile robot and the feature point respectively measured at different positions while rotating the mobile robot by 90° after forwardly moving the mobile robot from one position to another position. The controller 30 may also derive the coordinates of the remaining feature points, using the below Expression 1, for example, in the above-described manner.

$$\tan\alpha = \frac{Y-y}{X-x}$$ [Expression 1]

$$\begin{bmatrix} \tan\alpha_1 - 1 \\ \tan\alpha_2 - 1 \\ \tan\alpha_3 - 1 \\ \tan\alpha_4 - 1 \end{bmatrix} \cdot \begin{bmatrix} X_1 \\ Y_1 \end{bmatrix} = \begin{bmatrix} \tan\alpha_1 \cdot x_1 - y_1 \\ \tan\alpha_2 \cdot x_2 - y_2 \\ \tan\alpha_3 \cdot x_3 - y_3 \\ \tan\alpha_4 \cdot x_4 - y_4 \end{bmatrix}$$

Here, "α" represents an angle defined between the mobile robot and the feature point, "X, Y" represents the coordinates of the feature point, and "x, y" represents the coordinates of the mobile robot.

The coordinates of the feature point having two unknown values may be derived through a movement of the mobile robot repeated two times in accordance with the above Expression 1, for example. In accordance with embodiments of the present invention, however, the coordinates of the feature point may be derived through a movement of the mobile robot repeated four times, in order to reduce errors of the derived feature point coordinates.

The controller 30 may then apply, to an extended Kalman filter (EKF), the position of the mobile robot, the position of the feature point, and the angle defined between the mobile robot and the feature point in the horizontal line image during the movement of the mobile robot, in order to achieve a desired SLAM.

Hereinafter, a SLAM method for a mobile robot according to an embodiment of the present invention will be described with reference to FIGS. 1, 5, 6 and 7.

Figure 7:
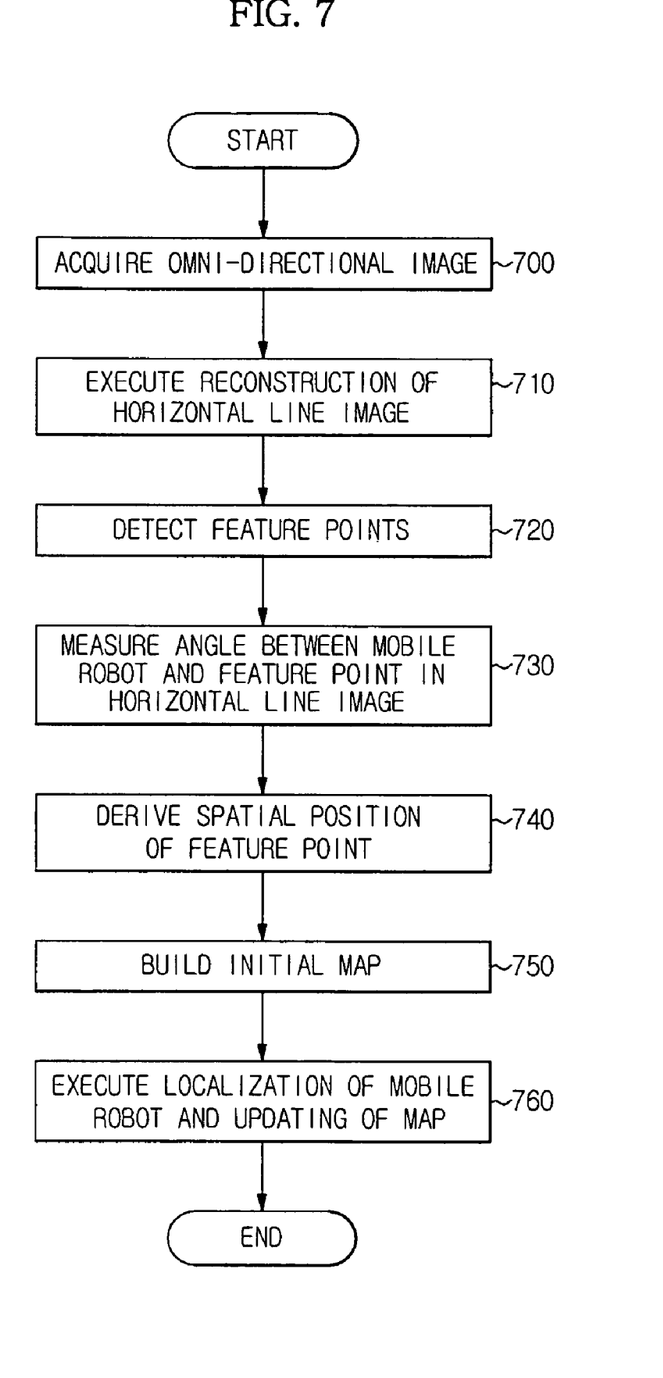
FIG. 7 is a flow chart illustrating a simultaneous localization and map building (SLAM) method for the mobile robot according to an embodiment of the present invention.

When the mobile robot 10 is located at an arbitrary spatial position, the omni-directional camera 11 of the mobile robot 10 photographs an omni-directional image (700).

Figure 6:
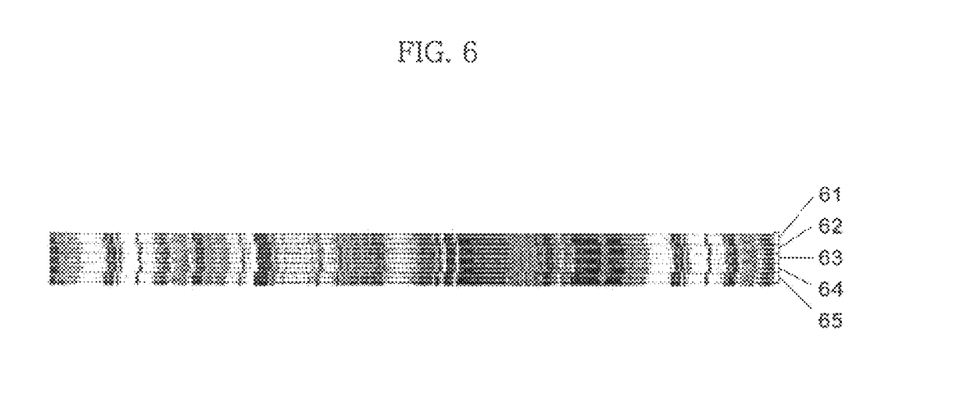
FIG. 6 is a view illustrating a horizontal line image reconstructed from the omni-directional image, for example as shown in FIG. 3, according to an embodiment of the present invention.

The photographed omni-directional image is sent to the image processor 20. The image processor 20 analyzes the omni-directional image, and extracts a horizontal line from the analyzed omni-directional image. The image processor 20 then creates, from the extracted horizontal line (third horizontal line 63), two horizontal lines (second 62 and fourth 64 horizontal lines), to which a 3×3 Gaussian filter is applied, and two horizontal lines (first 61 and fifth 65 horizontal lines), to which a 5×5 Gaussian filter is applied. Thereafter, the image processor 20 creates a reconstructed horizontal line image, in which the first to fifth horizontal lines, 61-65 respectively, are arranged in this order, as shown in FIG. 6. The reconstructed horizontal line image is stored in the memory 40, while being sent to the controller 30 (710).

When the controller 30 receives the reconstructed horizontal line image, it detects, from the reconstructed horizontal line image, feature points each having a color severely darker than a background (720).

Figure 5:
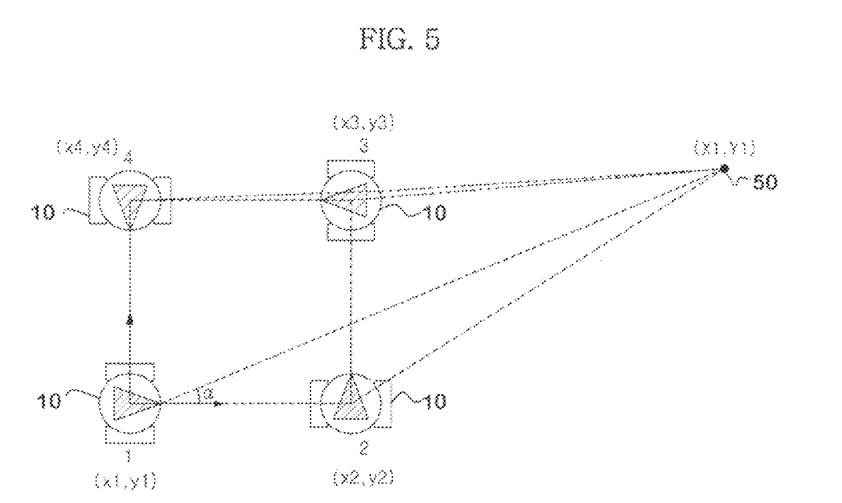
FIG. 5 is a schematic view illustrating a movement of the mobile robot carried out to derive a feature point in accordance with an embodiment of the present invention.

After detecting the feature points, the controller 30 derives information as to the position of the mobile robot 10 and an angle, α in FIG. 5, for example, defined between the mobile robot and each feature point, 50 in FIG. 5, for example, in order to find the spatial position of the feature point 50. In order to find the spatial position of each feature point, the controller 30 measures the coordinates (x, y) of the mobile robot 10 at four different positions while rotating the mobile robot 10 by 90° after forwardly moving the mobile robot 10 from one position to another position, as shown in FIG. 5. In this case, the controller 30 derives the angle between the mobile robot 10 and the feature point 50 by matching the reconstructed horizontal line image sent from the image processor 20 whenever the mobile robot 10 moves from one position to another position, with the horizontal line image reconstructed at the previous position and stored in the memory 40, in accordance with a SAD method (730).

Thereafter, the controller 30 may apply, to the above-described Expression 1, for example, the position of the mobile robot 10 and the angle between the mobile robot 10 and each feature point, which have been measured or derived with respect to each movement position of the mobile robot 10, thereby deriving two-dimensional spatial coordinates (X, Y) of the feature point (740).

After deriving the coordinates of all feature points in accordance with repetition of the above-described operations, the controller 30 builds an initial map, based on the coordinates of the feature points (750).

After building the initial map, the controller 30 moves the mobile robot 10 in accordance with a predetermined movement algorithm for the mobile robot 10, and receives a horizontal line image reconstructed through the image processor 20 at a position where the mobile robot 10 reaches. The controller 30 also receives a horizontal line image reconstructed at the previous position and stored in the memory 40. The controller 30 executes a matching operation for the received two reconstructed horizontal line images in accordance with a SAD method, to derive an angle defined between the mobile robot 10 and each feature point. Thereafter, the controller 30 may apply, to the above-described Expression 1, the position of the mobile robot 10 and the angle between the mobile robot 10 and each feature point, which have been measured or derived through the matching operation with respect to each movement position of the mobile robot 10, thereby deriving the spatial position of the feature point. The controller 30 then applies spatial position data of all feature points to an EKF, thereby simultaneously executing localization of the mobile robot 10 and updating of the map (760).

As is apparent from the above description, embodiments of the present invention are capable of reducing the time taken to achieve a SLAM by executing the SLAM using only the information from a horizontal line included in an omni-directional image.

In accordance with embodiments of the present invention, the localization of a mobile robot is achieved using a map built during a movement of the mobile robot, without executing the localization of the mobile robot using predetermined reference images. Accordingly, the mobile robot easily adapts to variation in the surrounding environments.

Embodiments of the present invention can also reduce noise and errors generated in a horizontal line matching operation by using horizontal line images reconstructed by Gaussian filters.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). The computer readable code can also be transferred on transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A simultaneous localization and map building method for a mobile robot, comprising:
   extracting a single horizontal line from an omni-directional image photographed everywhere the mobile robot is positioned during a movement of the mobile robot;
   correcting the extracted horizontal line, to create a horizontal line image; and
   simultaneously executing a localization of the mobile robot and building of a map for the mobile robot, using the created horizontal line image and a previously-created horizontal line image,
   wherein the created horizontal line image comprises the extracted horizontal line, two horizontal lines to which a 3×3 Gaussian filter is applied, and two horizontal lines to which a 5×5 Gaussian filter is applied.

2. The simultaneous localization and map building method according to claim 1, wherein the horizontal line exists on the same plane as an epipolar plane of an omni-directional camera which photographs the omni-directional image.

3. A non-transitory computer readable recording medium having recorded thereon a computer program for executing the simultaneous localization and map building method according to claim 1.

4. The simultaneous localization and map building method according to claim 1, wherein the two horizontal lines are respectively arranged above and beneath the extracted horizontal line.

5. The simultaneous localization and map building method according to claim 1, wherein:
   the extracted horizontal line comprises pixels, and has a feature point; and
   the feature point is a dark pixel having a brightness less than the remaining pixels of the extracted horizontal line by at least one brightness level.

6. The simultaneous localization and map building method according to claim 5, wherein:
   the created horizontal line image has the feature point;
   coordinates of the feature point are derived using a relationship between the position of the mobile robot, and an angle defined between the mobile robot and the feature point.

7. The simultaneous localization and map building method according to claim 6 wherein the coordinates are determined by evaluating the following expression $$\tan\alpha = \frac{Y-y}{X-x}$$

$$\begin{bmatrix} \tan\alpha_1 - 1 \\ \tan\alpha_2 - 1 \\ \tan\alpha_3 - 1 \\ \tan\alpha_4 - 1 \end{bmatrix} \cdot \begin{bmatrix} X_1 \\ Y_1 \end{bmatrix} = \begin{bmatrix} \tan\alpha_1 \cdot x_1 - y_1 \\ \tan\alpha_2 \cdot x_2 - y_2 \\ \tan\alpha_3 \cdot x_3 - y_3 \\ \tan\alpha_4 \cdot x_4 - y_4 \end{bmatrix},$$

wherein, "$\alpha$" represents the angle defined between the mobile robot and the feature point, "X, Y" represents the coordinates of the feature point, and "x, y" represents the coordinates of the mobile robot.

8. The simultaneous localization and map building method according to claim 6, wherein the angle defined between the mobile robot and the feature point in the created horizontal line image is derived by matching the feature point in the created horizontal line image with a corresponding feature point of the previously-created horizontal line image.

9. The simultaneous localization and map building method according to claim 8, wherein the feature point matching is executed using a sum of absolute difference (SAD) method.

10. The simultaneous localization and map building method according to claim 6, wherein the simultaneous localization and map building for the mobile robot is executed by applying, to an extended Kalman filter, the position of the mobile robot, the position of the feature point, and the angle defined between the mobile robot and the feature point in the created horizontal line image.

11. A simultaneous localization and map building method for a mobile robot, comprising:
    extracting a single horizontal line from an omni-directional image photographed during a movement of the mobile robot;
    correcting the extracted horizontal line, to create a horizontal line image;
    matching the created horizontal line image with a previously created horizontal line image, to derive an angle defined between the mobile robot and a feature point represented within the created horizontal line image; and
    finding a position of the feature point, using a variation in the angle depending on a moved position of the mobile robot,
    wherein the created horizontal line image comprises the extracted horizontal line, two horizontal lines to which a 3×3 Gaussian filter is applied, and two horizontal lines to which a 5×5 Gaussian filter is applied.

12. The simultaneous localization and map building method according to claim 11, further comprising:
    applying, to an extended Kalman filter, the moved position of the mobile robot, the position of the feature point, and the angle defined between the mobile robot and the feature point within the created horizontal line image, after the position of the feature point is found, to build a map according to the moved position of the mobile robot.

13. The simultaneous localization and map building method according to claim 11,
    wherein the two horizontal lines are respectively arranged above and beneath the extracted horizontal line.

14. The simultaneous localization and map building method according to claim 13, wherein the created horizontal line image is matched with the previously-created horizontal line image, respectively, to derive an angle defined between the mobile robot and the feature point respectively represented on each of the created horizontal line images.

15. The simultaneous localization and map building method according to claim 11, wherein the feature point is represented by a dark pixel included in pixels of the created horizontal line image while having a brightness lower than the remaining pixels of the extracted horizontal line by at least one brightness level.

16. The simultaneous localization and map building method according to claim 11, wherein the extracted horizontal line exists on the same plane as an epipolar plane of an omni-directional camera which photographs the omni-directional image.

17. A non-transitory computer readable recording medium having recorded thereon a computer program for executing the simultaneous localization and map building method according to claim 11.

18. A robot comprising:
    an image processor creating a horizontal line image from an omni-directional image; and
    a controller executing a simultaneous localization and map building operation (SLAM) using the created horizontal line image,
    wherein the controller executing the SLAM comprises extracting a single horizontal line existing on the same plane as an epipolar plane of an omni-directional camera from which the omni-directional image is taken, and
    wherein the created horizontal line image comprises the extracted horizontal line, two horizontal lines to which a 3×3 Gaussian filter is applied, and two horizontal lines to which a 5×5Gaussian filter is applied.

19. The robot according to claim 18 further comprising a memory to store the created horizontal line image.

* * * * *

UNITED STATES PATENT AND TRADEMARK OFFICE
CERTIFICATE OF CORRECTION

PATENT NO. : 8,331,652 B2
APPLICATION NO. : 12/153817
DATED : December 11, 2012
INVENTOR(S) : Sukjune Yoon et al.

It is certified that error appears in the above-identified patent and that said Letters Patent is hereby corrected as shown below:

Title page item (56), Column 2 (Other Publications); Line 6; Delete "Onnidirectional" and insert -- Omnidirectional --, therefor.
Title page item (56), Column 2 (Other Publications); Line 9; Delete "Vorkshop on Onmidirectional" and insert -- Workshop on Omnidirectional --, therefor.

In the Claims:
Column 9; Line 41-42; In Claim 11, delete "previously created" and insert -- previously-created --, therefor.
Column 10; Line 48; In Claim 18, delete "5×5Gaussian" and insert -- 5×5 Gaussian --, therefor.

Signed and Sealed this
Seventh Day of January, 2014

Margaret A. Focarino
*Commissioner for Patents of the United States Patent and Trademark Office*